Sept. 1, 1959 A. SALVI 2,902,537
DEAD END AND SPLICE CONNECTORS
Filed Jan. 12, 1954 2 Sheets-Sheet 1
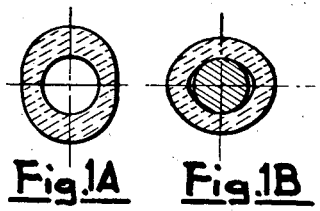
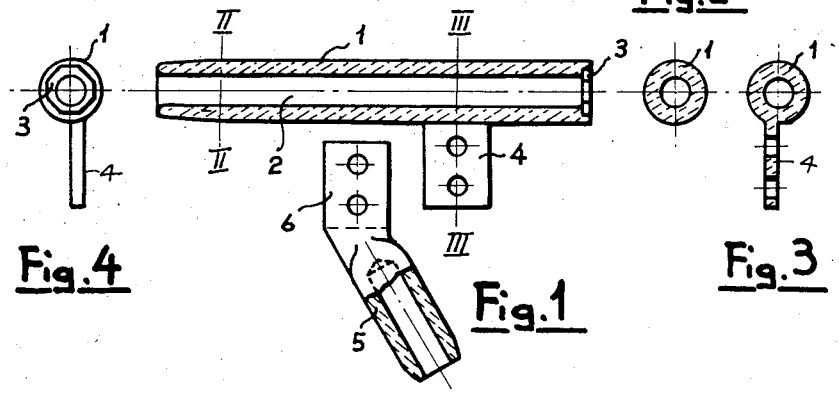
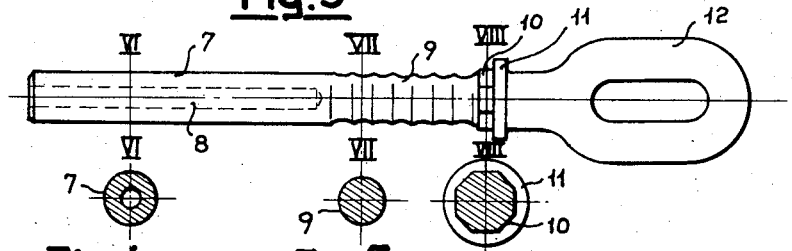
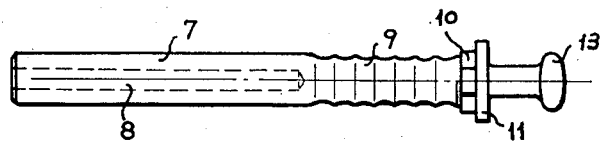
Inventor
ALESSANDRO SALVI
By
Attorney Sept. 1, 1959        A. SALVI        2,902,537
DEAD END AND SPLICE CONNECTORS
Filed Jan. 12, 1954        2 Sheets-Sheet 2
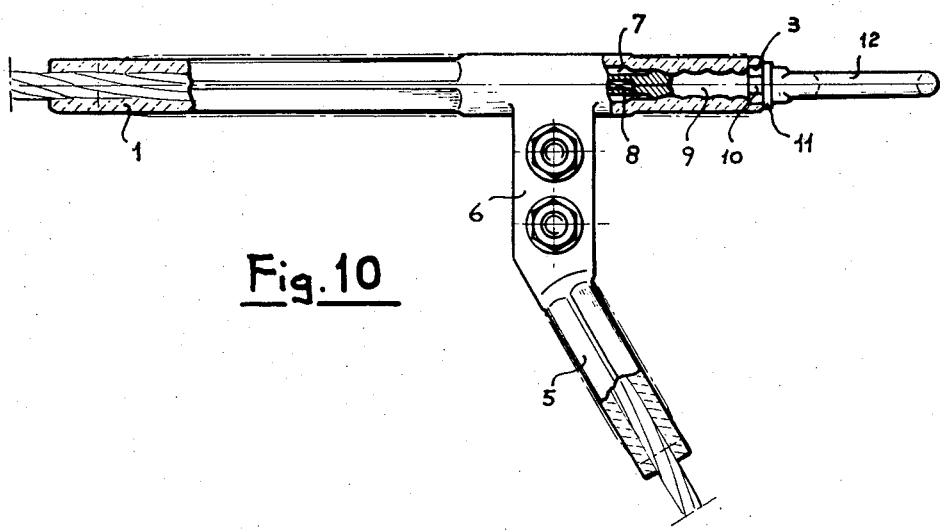
Fig. 10
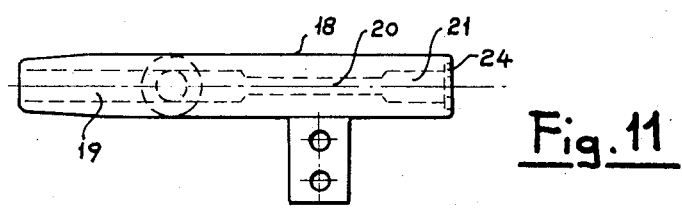
Fig. 11
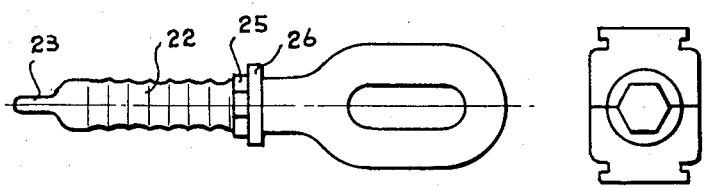 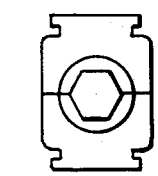
Fig. 12        Fig. 13
Inventor
ALESSANDRO SALVI
By
*Attorney*

United States Patent Office 2,902,537
Patented Sept. 1, 1959

2,902,537

DEAD END AND SPLICE CONNECTORS

Alessandro Salvi, Milan, Italy, assignor to A. Salvi & C. Gia I.F.I., Milan, Italy Application January 12, 1954, Serial No. 403,536

Claims priority, application Italy January 16, 1953

2 Claims. (Cl. 174—79)

For connecting electrical conductors to each other, more particularly conductors designed for high and very high voltages, by means of connecting sleeves, or to anchoring elements by means of anchoring clamps, oval section sleeves (Fig. 1A of the annexed drawing) have been used heretofore, which are pressed by means of circular section dies onto the conductors or the anchoring elements, therein inserted, or by means of circular section sleeves which are compressed by means of oval section dies in order to obtain by means of the compression a deformation of the sleeve for tightly fitting it onto the conductors and/or the anchoring element to be connected thereto.

However, the sleeve material only is strongly compressed in the direction of the compression of the two portions of the die, while in the direction perpendicular to said direction of compression, at two diametrally opposed points of the sleeve or anchoring clamp, badly compressed portions and large cavities can be found (Fig. 1B). Said cavities occur, in the case of anchoring clamps, both on the conductor and on the stem of the anchoring element, even when this element is shaped as to have undulated parts into which the material of the sleeve is deformed due to the effect of compression.

Thus, water penetrating into the interior of the assembly may easily cause early deterioration which consequently renders the anchoring clamp or the junction sleeve unfit for use.

Attempts have been made heretofore to overcome this disadvantage by injecting special grease or paste into the formed cavity through suitable holes and by sealing said holes thereafter. This method however, besides requiring a tiresome work during the assembling operation, is an expedient of dubious safety because the sealing of the holes can deteriorate due to many causes and because it is uncertain how long the grease or paste can be preserved. It also has been suggested to make use, in the case of anchoring clamps, of a thick felt packing between the head of the clamp and a shoulder in the anchoring element. Such a system, however, requires a continuous maintenance and inspection, since the packing is liable to get loose because of the ageing of the felt.

The above mentioned disadvantages are eliminated by means of the improvements in the assembling of joints and anchorages, forming the general object of the present invention.

According to the invention for joining and anchoring mono- or bimetallic conductors, sleeves or anchoring clamps are used respectively, having a circular section and being made of a high ductility metal, preferably of aluminium, copper, bronze or special steel, which have axial bores arranged for engaging the parts to be connected thereto, said sleeves or anchoring clamps being compressed onto said parts by means of polygonal section dies with chamfered corners arranged also for securing an efficient compression in the direction perpendicular to the direction of movement of the two portions of the die and therefore resulting in a uniform adherence of the sleeve onto the entire surface of the compressed part.

This ensures a tight closure of the anchorage and of the joint by the mere metallic adherence of the interconnected elements. Experience has taught that the best results are obtained by using a hexagonal section die the two portions of which get coupled according to a diameter passing through two opposite vertex of the hexagon.

Furthermore, according to the invention, in order to ensure a still better sealing at the end of the anchoring element or eye end, said eye end has a round disc located at the side opposite to the undulated area of the stem adjacent a piece of shaft having a polygonal section, which may be used for locating the steel eye end in a corresponding polygonal seat of the sleeve end or clamp body, against the head of which it abuts during the compression of the clamp onto the undulated stem. Obviously, the diameter of the said round disc must be such as to largely cover said sleeve end.

Further features of the object of the invention will appear from the following description of embodiments thereof, illustrated in the annexed drawing, in which:

Fig. 1 is an axial section of an anchoring clamp for mono- and bimetallic conductors, for being connected to a branching lug shown in the figure in a partially sectioned view.

Fig. 1A shows an oval section sleeve.

Fig. 1B shows a sleeve compressed around a round conductor.

Figs. 2 and 3 are cross sections according to lines II—II and III—III, respectively, of Fig. 1.

Fig. 4 is a front view of the clamp of Fig. 1 as seen from the side of the steel eye end.

Fig. 5 is a side view on enlarged scale of a steel eye end for anchoring clamps of bimetallic conductors according to Figs. 1 to 4.

Figs. 6, 7 and 8 are cross sections, according to lines VI—VI, VII—VII and VIII—VIII, respectively, of Fig. 5.

Fig. 9 is a side view of another form of a steel end equivalent to the eye end shown in Figs. 5 to 8.

Fig. 10 is a side view partly sectioned, of an assembly of an anchoring clamp composed of the parts illustrated in Fig. 1 and Fig. 5.

Fig. 11 is a side view of an anchoring clamp for monometallic conductors.

Fig. 12 is a side view, on enlarged scale, of the steel eye end for anchoring clamp according to Fig. 11.

Fig. 13 is a frontal view of a two-part die which can be used for locking anchoring clamps and junction sleeves according to Figs. 1 to 12.

According to Figs. 1 to 4, referring to an aluminium anchoring clamp for bimetallic conductors (that is one having a steel core and an aluminium mantle), the clamp has a body 1 provided with an axial bore 2 having a uniform diameter for the entrance of the conductor at one end and of the anchoring steel eye end at the other one. In correspondence to this latter end, the body 1 is provided with a polygonal seat 3. With the body 1 is integral or is welded thereon an extension 4 serving for the connection to a branching lug, for instance like the one indicated by the reference numeral 5 provided with a corresponding extension 6. The steel eye end (Figs. 5 to 9) to be combined with body 1 of the clamp, comprises a long cylindrical steel stem having a smooth portion 7, provided with an axial bore 8 for receiving the steel core of the conductor and an undulated solid portion 9 followed by a short polygonal portion 10 having a perimeter and a length corresponding to the perimeter and the length of the seat 3 of the body 1. Furthermore the stem is provided with a round disc 11 forming a collar of an eye 12 (Fig. 5) or of a button end 13 (Fig. 9). The eye serves for the insertion thereinto of the anchoring steel shackles for connecting the anchoring equipment in the ordinary case of line conductors. The button end serves equivalently for the attachment to double socket elements for anchoring the main bars in sub-stations.

For assembling the anchoring clamp, the body 1 is fitted over the conductor; after the steel core has been inserted into the axial bore 8 of the steel eye end, body 1 is slid on said steel eye end until the seat 3 of the body 1 fits over the polygonal portion 10. Thereafter, body 1 is compressed onto the steel eye end by using dies as shown in Fig. 13 and a strong locking is thus obtained with tight closure of the clamp due to the conforming of the material to the body 1 into the undulated part of the steel eye end and due to the pressure of said material against the round disc 11.

The anchoring clamp of the embodiments shown in Fig. 11 for monometallic conductors consists in an aluminium body 18 having an axial bore with a portion 19 having a diameter for permitting the insertion of the whole area of the conductor, a portion 20 having a reduced diameter for receiving the conductor deprived of one or more layers of wire and an enlarged portion 21 for receiving the steel eye end (Fig. 12) the stem of which in this case is limited to the solid undulated portion 22 provided with a cylindrical end point 23. In this case again, the body 18 comprises, at the inlet end for the steel eye end, a polygonal portion 24 to which corresponds in the steel clevis a polygonal portion 25 with a round disc 26 integral with the steel eye or an equivalent anchoring element. As mentioned before, the compression of body 18 onto the conductor and the steel eye end is equally obtained in this case by means of a hexagonal die.

The above described improvements in the anchorages allow to obtain a tight closure by means of the mere metallic adherence of the interconnected elements, excluding any other material such as felt, washers, grease or paste.

Obviously, the invention is not limited to the embodiments thereof represented in the drawing and described only by way of example, but many modifications can be made in the constructional details of said embodiments without departing from the scope of the invention.

Having thus described my invention, what I claim as new and desire to protect with Letters Patent is:

1. An anchoring clamp comprising an anchoring element having a stem on which is formed a transverse plate having an end face and a portion of polygonal cross section on the end face of said plate, and a sleeve-shaped connector adapted to fit over the stem and to be secured thereto by compressive deformation, the connector having at one end an internal polygonal seat to engage with the portion of polygonal cross section of the anchoring element to hold the connector at a fixed angular position in relation to the anchoring element and a flat end surface to bear against the end face of the plate, to thereby waterproof the joint between the anchoring element and the connector.

2. An anchoring clamp according to claim 1, wherein the anchoring element has a solid corrugated stem portion adjacent to the portion of polygonal cross section and a hollow cylindrical end portion to receive an electrical conductor.

References Cited in the file of this patent

UNITED STATES PATENTS

| 1,649,923 | Post | Nov. 22, 1927 |
| 1,886,086 | Damon | Nov. 1, 1932 |
| 2,604,508 | Bergan | July 22, 1952 |
| 2,669,600 | Bergan | Feb. 16, 1954 |

FOREIGN PATENTS

| 261,442 | Great Britain | Nov. 19, 1926 |